(12) United States Patent
Wyn-Davies

(10) Patent No.: US 11,300,235 B2
(45) Date of Patent: Apr. 12, 2022

(54) FLUID TIGHT CONNECTORS

(71) Applicant: DFx Technology Limited, Oxfordshire (GB)

(72) Inventor: Alan Wyn-Davies, Oxfordshire (GB)

(73) Assignee: DFx Technology Limited, Oxfordshire (GB)

( * ) Notice: Subject to any disclaimer, the term of this patent is extended or adjusted under 35 U.S.C. 154(b) by 201 days.

(21) Appl. No.: 16/810,287

(22) Filed: Mar. 5, 2020

(65) Prior Publication Data

US 2021/0278020 A1 Sep. 9, 2021

(51) Int. Cl.
*F16L 39/00* (2006.01)
*F16L 21/08* (2006.01)

(52) U.S. Cl.
CPC .............. *F16L 21/08* (2013.01); *F16L 39/00* (2013.01)

(58) Field of Classification Search
CPC . F16L 21/08; F16L 39/00; F16L 39/02; F16L 39/04; F16L 39/06; F16L 47/00; F16L 49/00
USPC ....... 285/19, 20, 121.6, 121.7, 120.1, 124.1, 285/124.2, 124.3, 124.4, 124.5
See application file for complete search history.

(56) References Cited

U.S. PATENT DOCUMENTS

| | | | |
|---|---|---|---|
| 3,527,480 A * | 9/1970 | Larson | F16L 37/56 285/85 |
| 4,553,938 A | 11/1985 | Olsen | |
| 7,258,369 B2 * | 8/2007 | Martin | F16L 37/18 285/124.5 |
| 2008/0012307 A1 * | 1/2008 | Taillon | F16L 27/0816 285/282 |
| 2014/0001748 A1 * | 1/2014 | Ignaczak | B29C 45/0005 285/124.1 |
| 2016/0356558 A1 * | 12/2016 | Franz | F28F 27/00 |
| 2020/0109742 A1 * | 4/2020 | Anderson | F16C 11/0671 |
| 2020/0124285 A1 * | 4/2020 | Ameser | F16L 39/00 |

OTHER PUBLICATIONS

Search Report for GB Application No. 1809794.9, dated Jan. 29, 2020, 6 pages.

* cited by examiner

*Primary Examiner* — Aaron M Dunwoody

(57) ABSTRACT

A connection apparatus for enabling connection of one or more fluid lines to a flow control system is provided. The apparatus includes, for the or each fluid line, a connector defining a flow channel extending therethrough along an axis. The fluid flow line can be coupled to one end of the flow channel, and the connector further defines a shoulder providing an outer bearing surface extending circumferentially around the axis and curving along the axis. The apparatus further includes first and second plates configured to be clamped together with the connector to fix the connector therebetween. The first and second plates together define, for the or each connector, a space for supporting the shoulder with the connector in situ. The the inner surface of the space is curved to allow the connector to pivot relative to the plates on the bearing surface.

11 Claims, 2 Drawing Sheets

FLUID TIGHT CONNECTORS

TECHNICAL FIELD

The present invention relates to fluid tight connectors such as might be used, for example, to connect one or more fluid inflow lines to one or more respective fluid outflow lines. The invention is applicable in particular, though not necessarily, to connectors for connecting fluid lines transporting a carbonated beverage such as beer or cider.

BACKGROUND

Connectors for connecting together fluid lines or tubes are widely known in the art, such as those described in EP2860435 and EP3236127. Such connectors typically permit the insertion of at least one tube into the connector, forming at least one of any of a gas and fluid-tight seal between the connector and the tube. In many cases the connector sits within a connection apparatus or plug that allows for multiple lines to be connected into a fluid flow control system. An example flow control system may be a system for controlling the flow of pressurized liquids such as beer or cider, where the liquids arrive in lines attached at a remote end to a keg or barrel and needs to be distributed out on one or more other lines coupled at their remote ends to liquid dispensing taps or pumps.

Often, an incoming line is contained within a so-called "python" which also contains circulating flow lines for a coolant such as water. These coolant lines are also coupled to the flow control system via respective connectors. The multiple lines are surrounded by an insulating jacket of the python. Ideally, the connection apparatus at the end of the python is easily plugged into a receiving port of the system such that fluid tight seals are obtained for the fluid flow lines. A given system may have multiple ports for receiving respective multiple pythons.

The use of individual connectors (within the connection apparatus attached at the end of the python) to connect to individual incoming lines permits the creation of a good seal between lines and connectors. However, for a given connection, the movement of at least one of any of the connector and line is relatively unrestricted to permit the connector and tube to aligned sufficiently well to form a good seal. Misalignment of any of the line and connector may lead to a poor seal being formed. In systems where a fluid or gas is under pressure, such misalignment can lead to an imbalance of pressure around the seal and can in some cases cause sufficient parting of the line from the connector so as to cause the seal to break and the fluid or gas to leak from said system.

In systems where multiple connectors are present within a connection apparatus to facilitate connection of multiple flow lines, it is necessary for the movement of at least one of any of the connectors or tubes to remain relatively unrestricted to permit each pair of said tubes and connectors to form good seals.

Some connection apparatus (e.g. as illustrated in FIG. 1) incorporate manifolds A to permit the connection of multiple lines B to multiple connectors C. Typically, both the lines and connectors incorporated into these systems will be held in place rigidly. The movement of both the lines and the connectors is restricted to ensure alignment of the lines and connectors and the formation of good seals when the manifold is positioned such that the lines and connectors are connected.

It is necessary for the aforementioned manifold, lines and connectors to be manufactured precisely to ensure good alignment between the lines and connectors and the formation of good seals and prevent misalignment that may lead to the breaking of the seals and any of gas or fluid to leak from said system.

To manufacture and assemble such aforementioned manifold, lines and connectors with sufficient precision can be prohibitively expensive and impractical, at least for certain applications.

SUMMARY OF THE INVENTION

According to an aspect of the present invention there is provided connection apparatus for enabling connection of one or more fluid lines to a flow control system. The apparatus comprises, for the or each fluid line, a connector defining a flow channel extending therethrough along an axis, wherein the fluid flow line can be coupled to one end of the flow channel, the connector further defining a shoulder providing an outer bearing surface extending circumferentially around said axis and curving along the axis. The apparatus further comprises first and second plates configured to be clamped together about the or connector to fix the connector(s) therebetween, with the first and second plates together defining, for the or each connector, a space for supporting said shoulder with the connector in situ, wherein the inner surface of said space is curved to allow the connector to pivot relative to the plates on the bearing surface.

Other aspects and features of the invention are set out in the appended claims.

DETAILED DESCRIPTION

Figure 1:
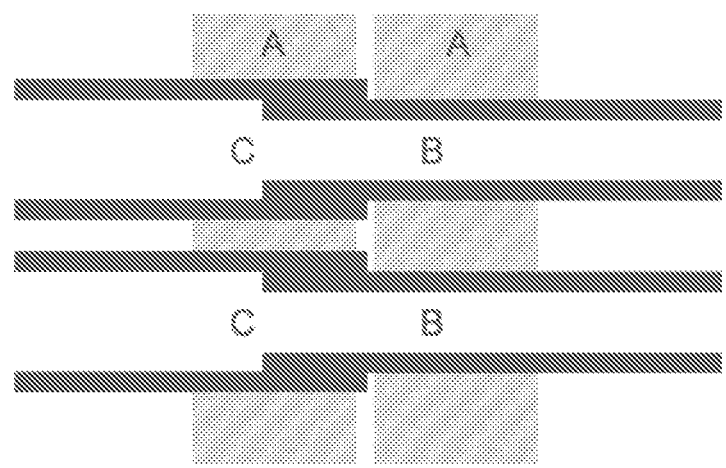
FIG. 1 illustrates schematically a manifold according to a prior art construction for connecting two lines to respective connectors.

A known manifold or connection apparatus has been described above with reference to FIG. 1, according to which fluid flow lines B are connected to openings of respective connectors C. The rigid nature of the connections that are formed makes it difficult to obtain good seals. This is particularly so when the projecting ends of the connectors C (i.e. extending to the left in the Figure) must be pushed into fixed flow path openings of a port of a flow control system (not shown in the Figure). This action of pushing the ends into the openings of the port may cause disruption of the seals between the incoming flow lines B and the connectors C, resulting in leak of gas or liquid within the connection apparatus.

Figure 2:
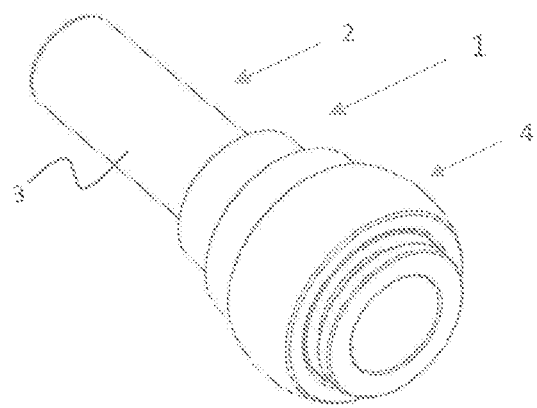
FIG. 2 is a perspective view of a connector.
Figure 3:
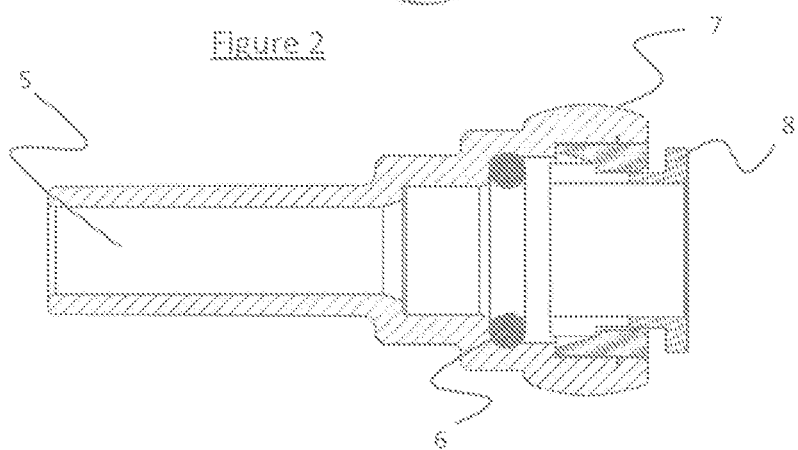
FIG. 3 is an axial cross-sectional view of the connector of FIG. 2.

FIGS. 2 and 3 illustrate an improved connector 1 such as might be provided within a connection apparatus to be attached to the end of a python (see further discussion below). The connector 1 comprises a molded body part 2 having an elongate tubular section 3 and a plurality of stepped features including a shoulder 4. As is best seen in FIG. 3, a fluid flow channel 5 extends axially through the body part 2 with openings at both ends. An elastomeric O-ring 6 sits coaxially within the channel 5. The outer surface of the shoulder 4 provides a bearing surface 7 that is curved in the axial direction, i.e. in the plane of the cross-section. This curvature is preferable spherical although other curvatures are possible. Located within the larger of the two openings of the channel is a two-part grip type coupling 8. This coupling is of a known type and will not be considered in detail here. Needless to say, the coupling is able to receive and grip an end of a flow line using a plurality of circumferentially arranged fingers.

Figure 4:
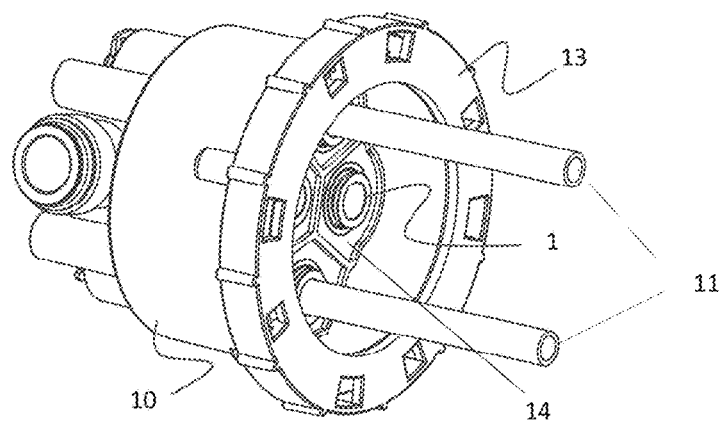
FIG. 4 is a perspective view of an assembled connection apparatus coupled to a port of a flow control system.
Figure 5:
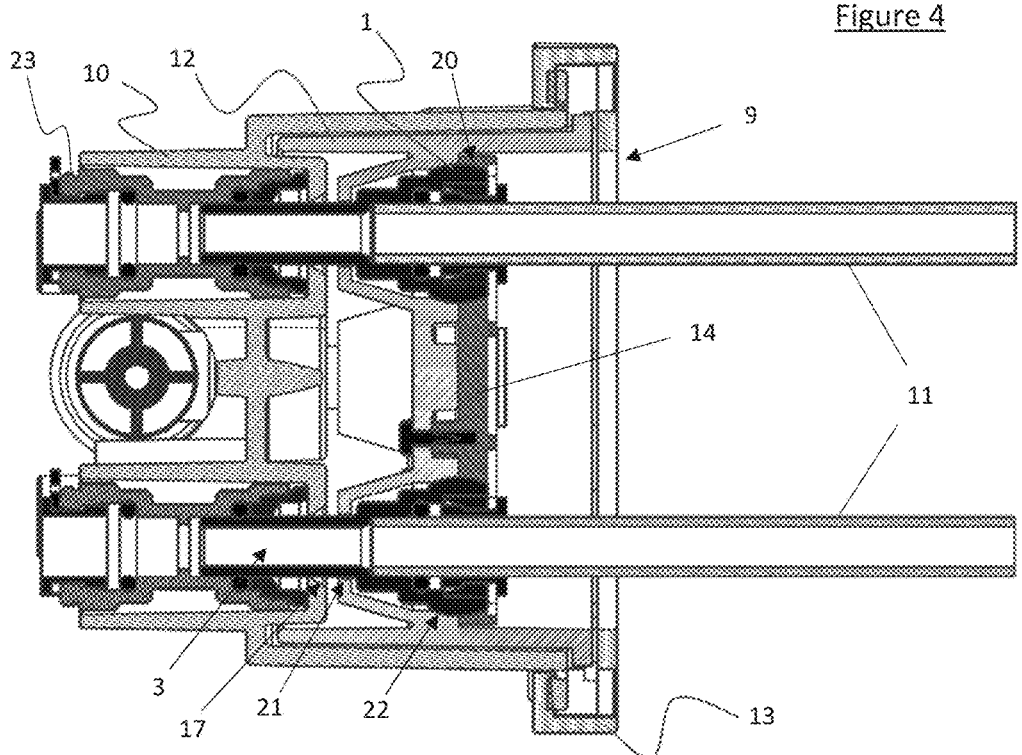
FIG. 5 is a cross-sectional view through the connection apparatus and port of FIG. 4.
Figure 6:
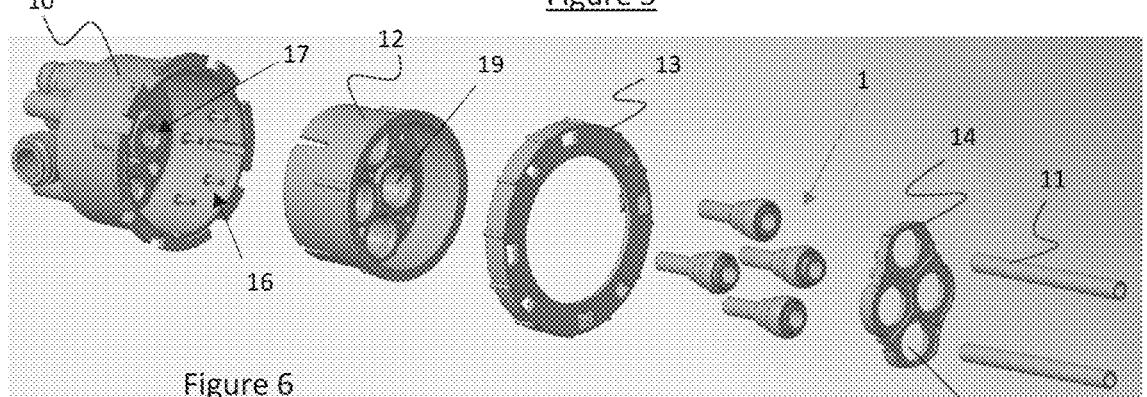
FIG. 6 is an axially exploded view of the connection apparatus and port of FIGS. 4 and 5.

A plurality of these connectors 1 (specifically four in this example) are integrated into a connection apparatus 9 as illustrated in FIGS. 4 to 6. These figures also illustrate a connection port 10 of a flow control system into which the connection apparatus 9 is plugged in order to couple incoming flow lines 11 to flow paths of the system. The illustrated connection apparatus is configured to couple four flow lines to the flow control system. However, for ease of viewing only two such lines 11 are shown in the Figures. It will be appreciated that these lines are typically semi-rigid, and maybe of a polyurethane or similar high density plastic.

The connection apparatus comprises four major parts. These are a first plate 12 of generally cylindrical shape, a retaining ring 13, the connectors 1, and a second plate 14. These parts are assembled around the end of a python, although only the fluid flow lines 11 are shown. Typically, the flow lines are inserted through respective holes 15 in the second plate 14, with the ends of the lines being pushed into the openings of respective connectors such that they are gripped by the two-part grip type couplings 8 (see FIG. 3). The shoulders 4 of the connectors are received by recesses surrounding the holes 15 as is further described below. The connectors, second plate and lines are then passed through the large central opening of the retaining ring 13 and into the first plate 12. Here, the tubular sections 3 of the connectors 1 are received by and pass through respective openings 19 in the first plate 12. The insulating jacket of the python which surrounds the flow lines 11 will in practice also pass through the retaining ring 13 and into the cup shaped opening provided by the first plate 12. In this state, the plate 14 and ends of the connectors 2 will be enclosed by the jacket.

A plurality of screws 16 are then used to secure the first and second plates together. It will be appreciated that, in this state of assembly, the connection apparatus can be pushed into the connection port 10 such that the tubular sections 3 of the connectors are received by respective flow openings 17 of the port. Behind these openings 17 are provided respective coupling members 23 which are configured to receive and engage the ends of the tubular sections 3 in a fluid tight manner. The retaining ring 13 in this state acts against the back of the first plate 12 but is free to rotate relative to that plate. The retaining ring 13 has features that engage with features around the port 10 by relative rotation, pulling the connection apparatus 9 towards the port as the ring is rotated and holding it securely in place (in a bayonet-style arrangement).

As is best illustrated in FIG. 5, the shoulder 4 of each connector is held securely between the first and second plates 12,14. The recesses (pointed out generally by reference numeral 20) surrounding the holes 15 in the second plate 14 have already been referred to. These recesses 20 have a generally curved profile that is complimentary to the curved surfaces 7 of the shoulders 4. The openings 19 of the first plate 12 are further shaped to have a curved profile (pointed to generally by reference numeral 22) that again is complimentary to the curved surfaces of the shoulders. The openings 19 narrow in a funnel-like manner so that the connector shoulders 4 can enter but not pass through the openings 19. The shoulders 4 are therefore retained in respective sockets formed by the first and second plates 12,14 and, subject to further restrictions, have a freedom to rotate or pivot relative to the rest of the connection apparatus structure, with the outer surfaces 7 of the shoulders 4 acting as bearing surfaces.

The tubular sections 3 exit through the rear of the first plate 12. The openings 21 through which they exit have an inner diameter that is slightly greater than the outer diameters of the tubular sections 3, e.g. by 1 mm or so. This restricts the pivoting of the tubular sections 3, e.g. to perhaps 3 to 10 degrees. This is sufficient however to allow the ends of the tubular sections 3 to self-locate to the central axis of the respective flow openings 17 of the port 10 as those openings have a funnel shaped entrance. The tubular sections 3 can of course pivot independently of one another as the connection apparatus 9 is brought into engagement with the port 10. In conjunction with the flexibility of the lines 11, this allows coupling without disturbing the seals between the lines and the connectors.

It will of course be appreciated that the references to multiple flow lines is merely exemplary. The apparatus described here can be used to connect a single flow line to a flow control system. It will also be appreciated that the apparatus has applicability to many different types of flow systems and is not limited to use with carbonated beverages.

It will be appreciate by the person of skill in the art that various modifications may be made to the above described embodiments without departing from the scope of the present invention.

The invention claimed is:

1. Connection apparatus for enabling connection of one or more fluid lines to a flow control system, the apparatus comprising:
    for the or each fluid line, a connector defining a flow channel extending therethrough along an axis, wherein the fluid flow line can be coupled to one end of the flow channel, the connector further defining a shoulder providing an outer bearing surface extending circumferentially around said axis and curving along the axis;
    first and second plates configured to be clamped together about the or each connector to fix the connector(s) therebetween,
    the first and second plates together defining, for the or each connector, a space for supporting said shoulder with the connector in situ, wherein the inner surface of said space is curved to allow the connector to pivot relative to the plates, on the bearing surface.

2. Apparatus according to claim 1, wherein a surface defining said space is curved to provide a surface complimentary to said bearing surface.

3. Apparatus according to claim 2, wherein the curved surfaces are generally spherical.

4. Apparatus according to claim 1, wherein the or each connector comprises a substantially homogenous body part defining said shoulder, and an insert part for gripping an end of a flow line within the connector.

5. Apparatus according to claim 4, the body part of the or each connector defining a tubular section extending from the shoulder.

6. Apparatus according to claim 5, said first plate defining openings therethrough and through which respective tubular sections pass, the openings being shaped to allow only restricted pivoting of the connectors.

7. Apparatus according to claim 1 and comprising at least two said connectors.

8. Apparatus according to claim 1 in combination with a port configured to receive the apparatus in a plug-and-socket arrangement, the port comprising a plurality of openings for receiving respective connectors of the apparatus.

9. A combination according to claim 8, said openings being funnel shaped whereby the connectors are guided towards the central axes of the openings aided by pivoting of the connectors relative to the first and second plates.

10. A combination according to claim 9, said connection apparatus comprising a retaining ring located behind the first plate and acting on the first plate in a generally axial direction whilst being rotatable around the axis relative to the first plate, the retaining ring having features for engaging with complimentary features of the port in order to secure the connection apparatus to the port.

11. A combination according to claim 10, wherein the features on the retaining ring and said complimentary features provide for a bayonet or screw type connection.

* * * * *